UNITED STATES PATENT OFFICE.

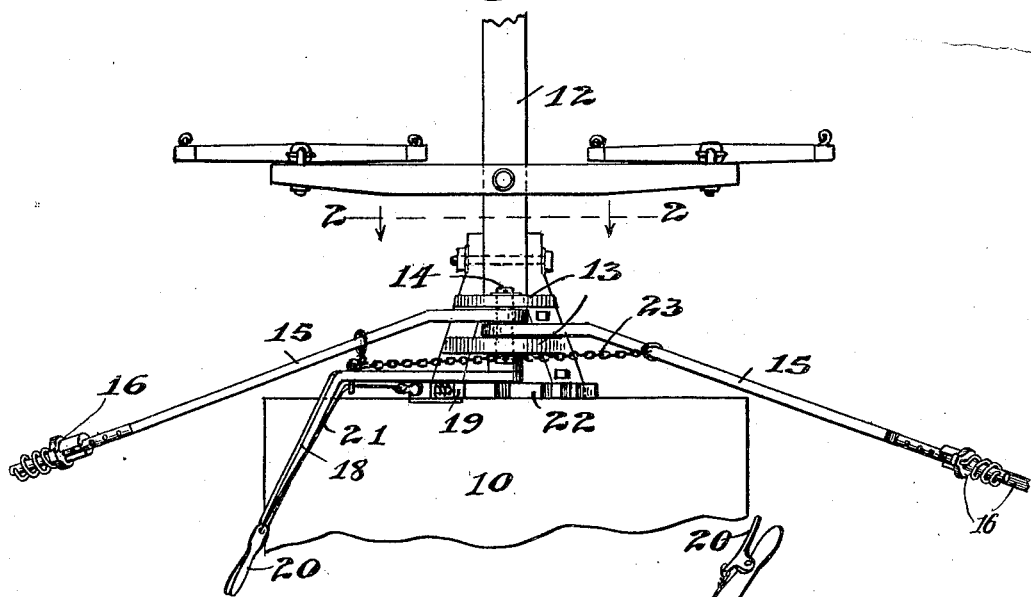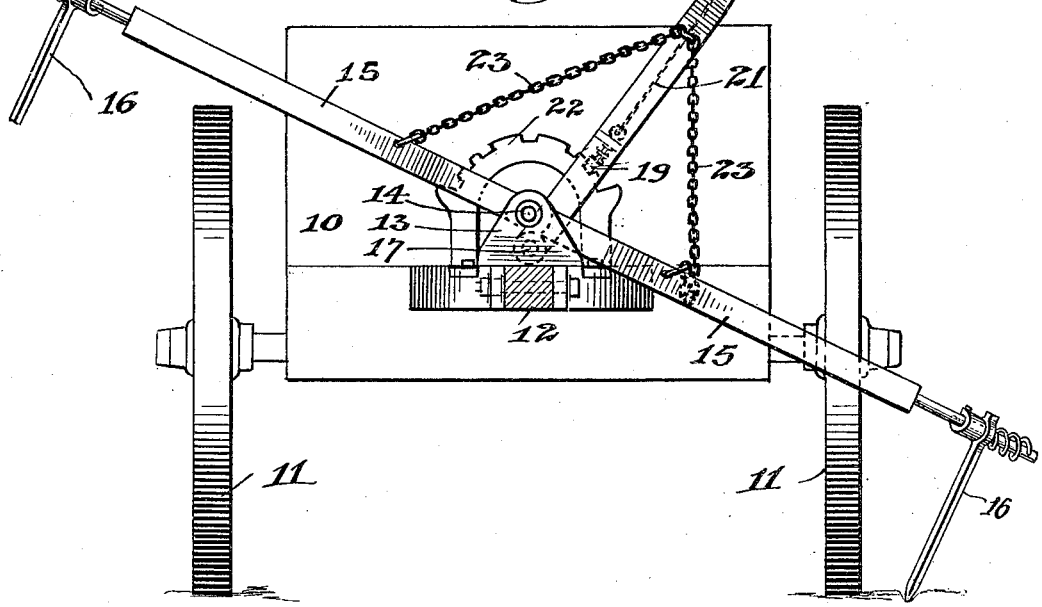

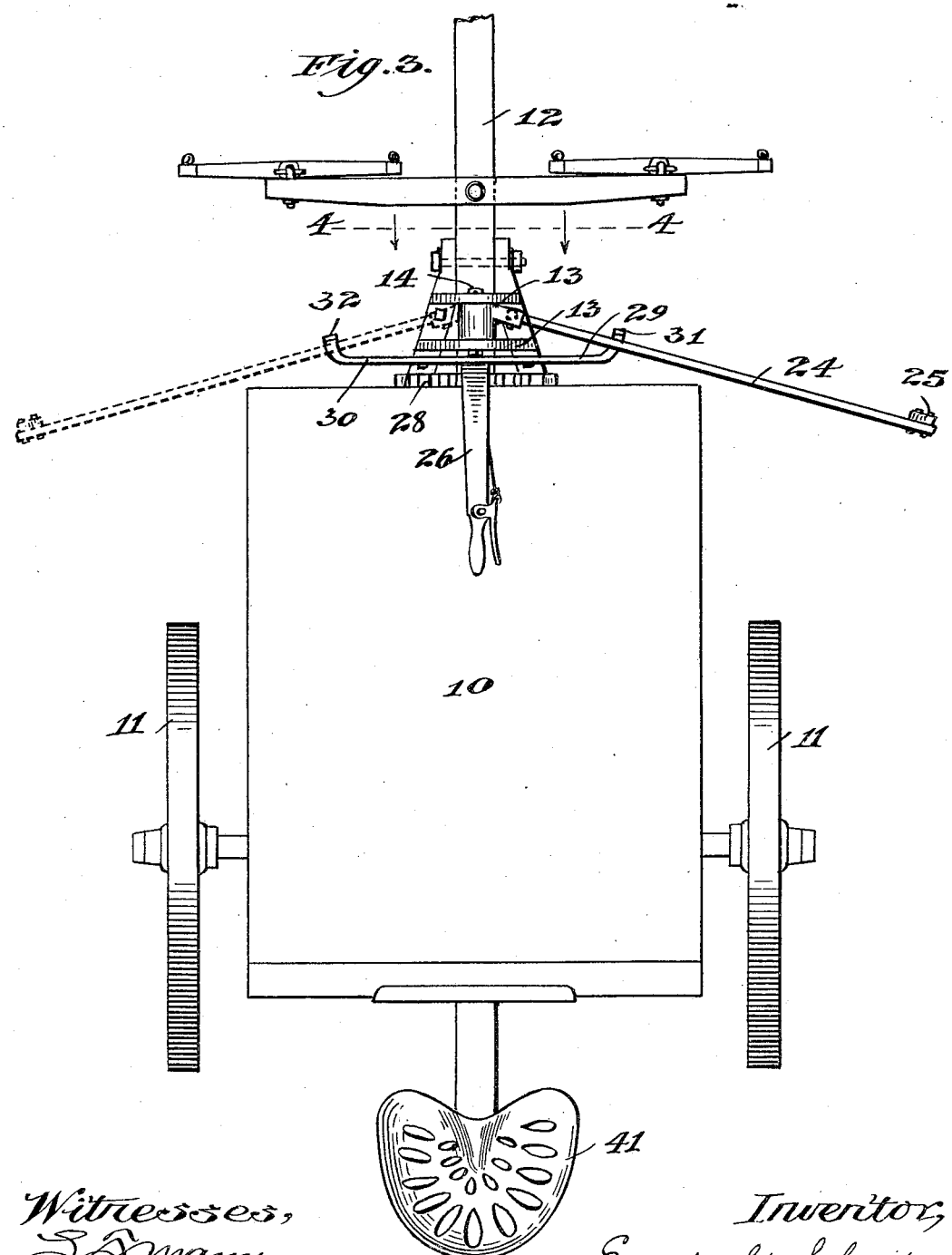

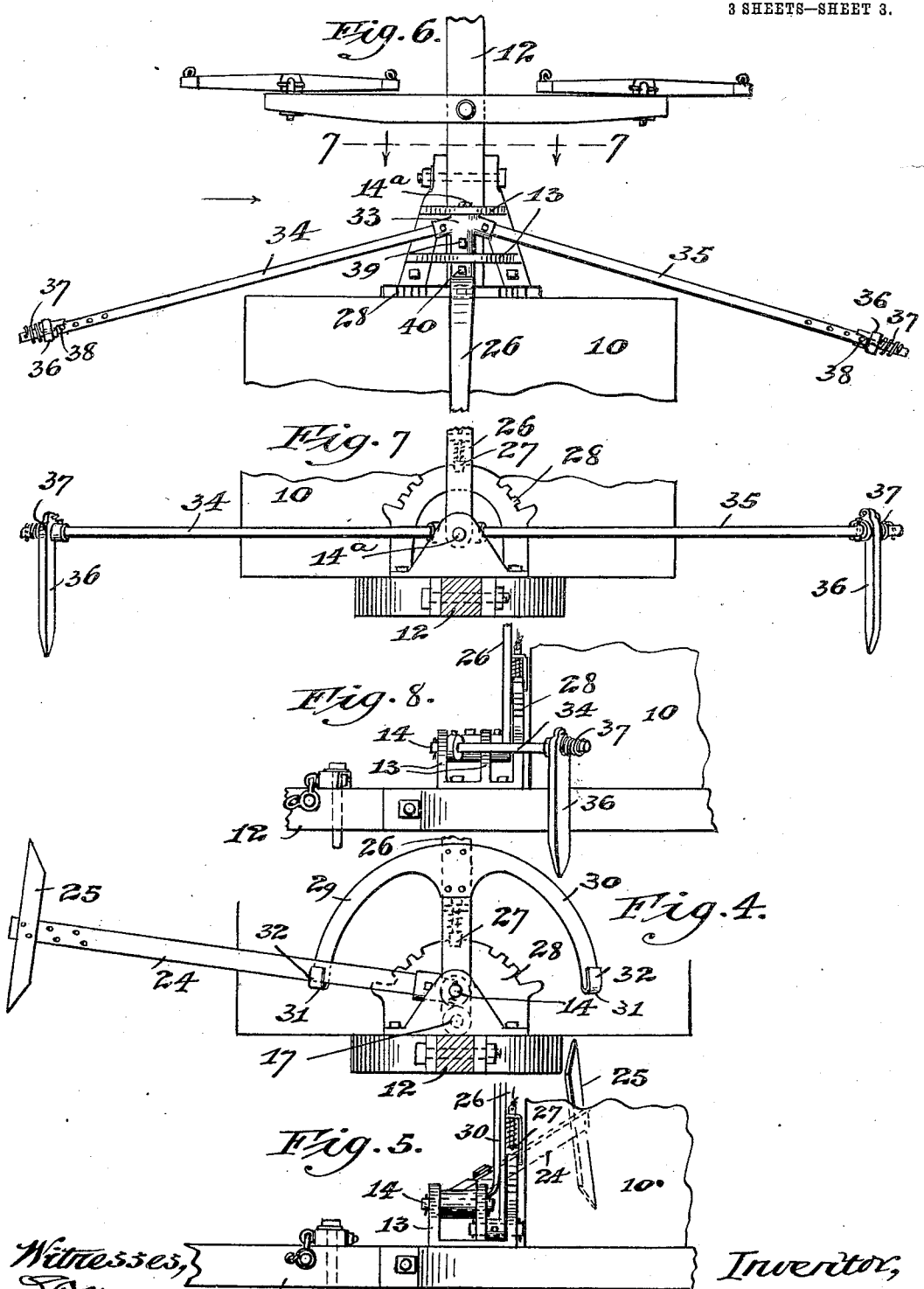

ERNST G. SCHREIBER, OF HAMMOND, INDIANA.

GAGE-OPERATING MECHANISM FOR PLANTERS.

934,575.

Specification of Letters Patent.  Patented Sept. 21, 1909.

Application filed April 13, 1908.  Serial No. 426,899.

*To all whom it may concern:*

Be it known that I, ERNST G. SCHREIBER, a citizen of the United States, residing at Hammond, in the county of Lake and State of Indiana, have invented certain new and useful Improvements in Gage - Operating Mechanisms for Planters, of which the following is a specification.

My invention concerns markers or gages and their actuating mechanisms adapted to be used in connection with planters, whereby the planting may be done in straight and parallel rows equally distant apart. With such devices it is desirable to have the marker for scraping or opening a guiding groove on the surface of the ground operate on one side of the planter while crossing the field in one direction, and work on the other side of the machine when the field is traversed in the opposite direction. Accordingly and with this object in view I have invented a device for marking on either side of the planter, and have equipped the same with means to render it operative on either side as appears desirable or necessary.

Other advantages of my improved construction will be made apparent from the following detailed description, which should be read in connection with the accompanying drawings forming a part of this specification.

On the various views of these drawings like reference characters refer to the same parts throughout.

Figure 1 is a plan view of one form of my improved marker or gaging device applied to the front portion of a planter; Fig. 2 is a vertical transverse section on line 2—2 of Fig. 1, as viewed in the direction indicated by the arrows; Fig. 3 is a plan view of a planter equipped with a modified form of marker or gage mechanism embodying my invention; Fig. 4 is a vertical cross-section on line 4—4 of Fig. 3 as viewed in the direction indicated by the arrows; Fig. 5 is a fragmentary side elevation of the marking mechanism; Fig. 6 is a plan view of a still further modified form of marking or gaging device; Fig. 7 is a vertical section on line 7—7 of Fig. 6 as viewed in the direction indicated by the arrows; and Fig. 8 is a fragmentary side elevation of the marker shown in Figs. 6 and 7.

Referring first to the embodiment of my invention shown in Figs. 1 and 2, it will be observed that I have illustrated a planter having a main body 10, wheels 11, and the usual pole 12 equipped with the customary draft appliances. On the planter in front of the box or body 10 there is mounted a pair of standards 13, 13 apertured in alinement to receive a hinge or pivot bolt 14 on which, between the standards, are rotatably mounted the inner ends of a pair of rearwardly-bent marker or gage arms 15, each equipped at its outer end with a marker or guiding groove former 16. Hinged or pivoted at 17 back of the rear standard 13 I provide a rearwardly-bent actuating handle 18 equipped with a spring-pressed locking-dog 19 controlled from the upper end of the handle by a pivoted grip piece 20 connected with the dog by a rod 21, which construction is usual and well known in this art. On the front face of the box or body 10 of the planter a notched segment 22 is fastened, with the notches of which the locking-dog 19 coöperates to hold the handle 18 in adjusted position. This operating handle 18 is connected to each of the independent arms 15 by chains 23, as is clearly illustrated.

When the handle 18 is in vertical position with its locking-dog or detent 19 in the middle notch of the curved rack 22, the chains 23 will raise both of the arms 15 and their markers sufficiently so that the lower ends of the latter escape the ground, and no marking or grooving by the same occurs. When the handle 18 is shifted transversely of the planter to one side or the other one of the markers 16 is lowered and the other raised, as is clearly illustrated in Fig. 2. In this position of the parts the lower marker rides upon the ground, forming on its surface a guiding groove or furrow, and since its arm 15 is free to be raised, owing to the loose chain connection with the operating handle 18, if the lower marker 16 strikes an obstruction, such as a stone, no damage to the mechanism occurs, because the arm 15 will rise allowing the marker to pass over the obstruction unharmed. The chain 23 secured to the higher marker is taut, as is shown in Fig. 2, preventing descent of the same and keeping it well away from the ground. A mere shifting or movement of the handle 18 in the reverse direction renders the previously inoperative marker operative and raises the other marker free of the ground. The handle 18, as is obvious, may be locked in any one of a plurality of positions, depending upon the particular conditions under which the planting and guiding marking is being done.

In Figs. 3, 4, and 5 I have shown a modified construction in which a single marker supporting arm 24 is pivoted or rotatably mounted on the supporting bolt 14. At its outer end the single arm 24 is equipped with a double-ended pointed marker or gage 25 of substantially the same construction as those indicated in Figs. 1 and 2. The operating handle 26 in this instance is also supplied with a spring-controlled sliding locking detent 27 which co-acts with the notches of a segment 28, and is further supplied with a pair of curved arms 29 and 30 having supporting hooks or bent portions 31 and 32 at their lower ends, respectively, and adapted to support the marker arm 24 when thrown to either side of the machine or planter.

When the handle 26 is in a vertical position, as shown in Figs. 3 and 4, the marker 25 will be held elevated sufficiently by either the hook 31 or the hook 32 so as to be inoperative. To render it operative, however, the handle 26 is unlocked from the segment 28 and turned to one side or the other, in which position it may be again locked by its spring detent. This shifting or turning of the handle lowers the corresponding arm 29 or 30 sufficiently to allow the marker to ride upon the surface of the ground and form a guiding groove. In order to shift the marker to the other side of the machine it is merely necessary to unlock the handle 26 and give it a sudden swinging movement toward the other side of the planter, sufficient to swing the marker 25 and its arm 24 on the bolt 14 to the other side of the machine where it will be engaged and supported by the hook 32. Owing to the fact that the marker arm 24 is free to be raised or turned on the pivot bolt 14 during the marking operation, if the marker 25 meets an obstruction it can readily ride over the same. It will be apparent from this description and illustration that this particular embodiment of my invention is equipped with but a single doubly-pointed or sharpened marker and a single pivoted supporting arm therefor which may be thrown to either side of the machine as becomes necessary.

In Figs. 6, 7 and 8 I have illustrated a still further modification of my improved construction, and in this form of device I mount on a bolt or shaft 14ᵃ, rotatable in the standards 13, a hub 33 to which is attached a pair of oppositely-projecting rearwardly-extended marker supporting arms 34 and 35, oscillatory on the outer end of each of which is a sharpened marker 36 spring-pressed forwardly by a spring 37 so that the upper portion of the hub or sleeve strikes against a stop 38. It is apparent, therefore, that these markers normally stand in a vertical position and are free to turn on their rods or arms 34 and 35 so as to readily pass over any obstruction in their paths and be returned to normal position afterward by their springs 37. In this embodiment of my invention the hub 33 is fixed to the rotatable bolt 14ᵃ by a set-screw 39, and the handle 26 is also fixed to the bolt by a set-screw 40, whereby turning of the handle causes the direct movement of the pair of arms and their attached markers. When the handle 26 is in a vertical position, as shown in Figs. 6, 7 and 8, both markers 36 are raised sufficiently so as to be inoperative, as is clearly shown in Fig. 7. When the handle is shifted to one side or the other one of the markers is lowered into operative position and the other still further raised. As is obvious, the handle may be locked or fastened in adjusted position with either of the markers in such position as to form a guiding groove or furrow of slight depth on the surface of the ground.

In all the embodiments of my invention shown and described herein I have provided means for marking the surface of the earth on either side of the planter and have supplied an operating handle within easy reach of the operator sitting in the seat 41, the actuation of which causes the marking to occur on one side or the other of the machine as is necessary. It should be noted that all of my embodiments of this invention are especially simple in construction, economical to manufacture, and not at all likely to become deranged or thrown out of order through ordinary usage.

Although I have described somewhat minutely the various structures shown on the drawings, it is to be noted and understood that my invention is not limited or restricted to the precise and exact features of construction shown and described because these may be modified to a considerable extent without departure from the heart of my invention.

Although I have shown in Figs. 6 and 7 only a marker 36 rotatably mounted on the marker-arm 35 and having a spring connection therewith, it is obvious that this form of gaging device or marker may be employed with any of the species of operating mechanisms illustrated and described. For example, it could be readily employed in the mechanism shown in Figs. 1 and 2, and I have accordingly claimed the same.

I claim:

1. In a gaging device for planters, the combination of a pivoted rearwardly-deflected marker adapted to scratch or groove the surface of the ground, a pivoted handle to render said marker operative or inoperative, means to lock said handle in a variety of positions, and a chain connecting said handle and marker whereby when the latter strikes an obstruction it may ride over the same, substantially as described.

2. In a gaging device for planters, the combination of a pair of markers adapted to scratch or groove the surface of the ground, a common shaft on which said markers are pivoted, a pivoted actuating handle to render said markers operative or inoperative, means to lock said handle in any one of a variety of positions, and chain connections between said handle and markers and of such length that the handle may lift both markers to inoperative position or may render either of said markers operative, substantially as described.

3. In a gaging device for planters, the combination of a pivoted marker arm, a marker oscillatory on said arm, a spring connection between said marker and arm, a handle to render said marker operative or inoperative, and means between said handle and marker arm whereby the movements of the former may cause the raising and lowering of the latter, substantially as described.

4. In a gaging device for planters, the combination of a pivoted marker arm, a marker oscillatory on said arm, a spring connection between said marker and arm, an operating handle to render said marker operative or inoperative, a chain connection between said handle and marker arm whereby the movements of the former may cause the raising and lowering of the latter, and means to lock said handle in any one of a plurality of positions, substantially as described.

5. In a gaging device for planters, the combination of a pair of marker arms, a common shaft to which said marker arms are pivoted, a marker oscillatory on each of said marker arms, a spring connection between each of said markers and its arm, a handle to render said markers operative or inoperative, and chains connecting said handle to said marker arms and of such length that the handle may lift both markers to inoperative position or may render either of said markers operative, substantially as described.

ERNST G. SCHREIBER.

Witnesses:
FREDERICK C. GOODWIN,
WALTER M. FULLER.